Nov. 21, 1967        R. F. MANKE        3,354,303

MECHANICAL AND ELECTRICAL PLUG-IN TYPE HEADLAMP MOUNTING

Filed Oct. 8, 1965

INVENTOR:

RAYMOND F. MANKE

Arthur J. Hansmann
ATTORNEY

United States Patent Office 3,354,303
Patented Nov. 21, 1967

3,354,303
MECHANICAL AND ELECTRICAL PLUG-IN TYPE HEADLAMP MOUNTING
Raymond F. Manke, Racine, Wis., assignor to J. I. Case Company, Racine, Wis., a corporation of Wisconsin
Filed Oct. 8, 1965, Ser. No. 494,147
5 Claims. (Cl. 240—41)

ABSTRACT OF THE DISCLOSURE

A mechanical and electrical plug-in type of headlamp mounting, with a support member for receiving springs connected with the headlamp. Openings are provided on the support member for receiving orientation projections connected with the lamp so that the lamp can be plugged in or snapped in with respect to the support member, and the lamp will be rotationally oriented on the support member. Electrical prongs are provided on the lamp, and an electrical receptacle is mounted on the support member.

This invention relates to a mechanical and electrical plug-in type headlamp, and specifically, it has application for mounting and connecting a headlamp to a vehicle, such as a tractor.

It is a general object of this invention to provide a means for connecting a headlamp to a vehicle so that the connection may be readily and easily made with a minimum of time but with the lamp disposed in a desired position with respect to the vehicle and to the axis of the lamp along the light beam thereof. Also, in accomplishing this particular object, it is an object to have the lamp firmly mounted and retained in position, but nevertheless have it so that it can be readily removed as well as mounted with respect to the vehicle.

Still another object of this invention is to provide a mechanical and electrical plug-in type headlamp mounting which is arranged so that both the physical attachment of the lamp to the supporting member, such as a vehicle on which it is mounted, and the electrical connection of the lamp can be made with a single movement of the lamp in mounting it on the supporting member. In accomplishing this particular object, it is significant that the electrical connections extending from the lamp itself align with the electric receptacle or the like on the vehicle so that upon alignment of the lamp for the plug-in type of attachment to the vehicle, the electrical connections are automatically aligned and also then completed.

Still another object of this invention is to provide a mechanical and electrical plug-in type headlamp mounting which does not require any tools for completing the assembly or disassembly of the headlamp with respect to a vehicle, is completely external with respect to the vehicle in that it requires no removal of vehicle parts such as hoods, screens, nuts, bolts, or the like, and it nevertheless disposes the headlamp in a properly focused or adjusted position, with all accomplished simply through the plug-in type of operation.

Still other objects of this invention include the provision of a mounting for a headlamp wherein the lamp can be readily assembled and disassembled with respect to a vehicle and wherein the operation can be readily and easily completed, and also wherein the lamp can be readily adjusted for beam focus and the like, with all accomplished without requirement of any special tools or skill.

Other objects and advantages become apparent upon reading the following description in light of the accompanying drawings, wherein.

Figure 1:
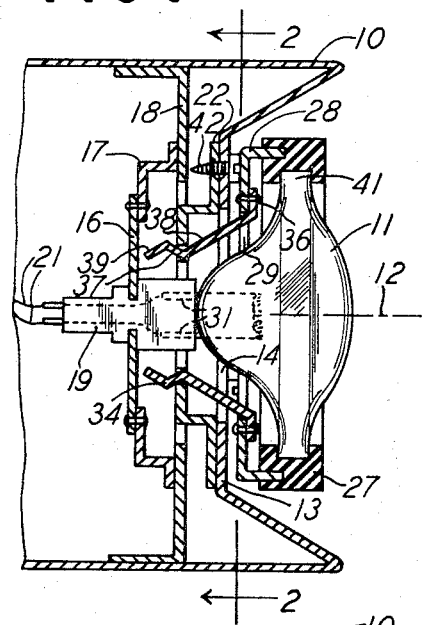
FIG. 1 is a longitudinal sectional view showing one embodiment of this invention wherein the headlamp is shown to be mounted on a portion of a vehicle.

A vehicle body 10 is shown to serve as a support member for the headlamp 11 which is mounted on the vehicle in a manner hereinafter described. The vehicle may be of a type such as a farm tractor, and it is of course to be understood that it will be desirable from time to time to assemble and disassemble the headlamp 11 with respect to the portion 10 of the vehicle. The lamp 11 will also be understood as having an axis 12 defining the axis of the beam of light emitted by the lamp 11. The vehicle body portion 10 thus has a ring portion 13 disposed on a plane which is transverse to the axis 12, and the inner ring portion 13 has a central circular opening designated 14.

The vehicle also has a support member 16 which is shown through structural members 17 and 18 to be rigidly connected with the body portion 10 and such connection may be in any suitable and well known manner. The support member 16 provides a support for a female type of electrical receptacle 19 which is thus shown to be rigidly and fixedly mounted. The receptacle 19 is also shown to have electric wires 21 extending into the receptacle 19 and extending therefrom. It would of course be understood that the necessary electrical power source and connections are made with respect to the wires 21 to bring electric power into the receptacle 19, all in any well known or common manner.

Figure 2:
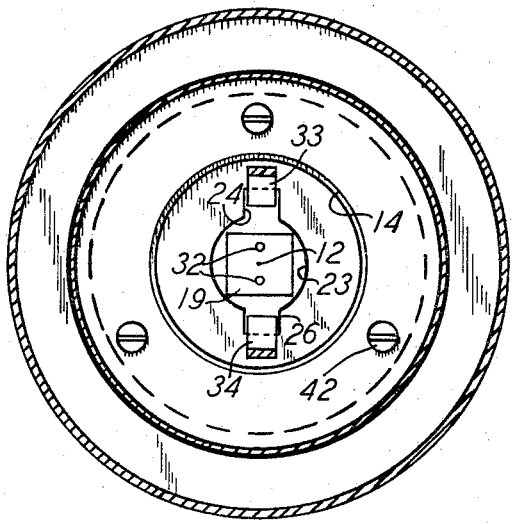
FIG. 2 is a sectional view taken on the line 2—2 of FIG. 1.

Also included as a part of the vehicle or support member itself is a ring 22 which is suitably connected to the ring 13 by spot welding or the like and it projects radially inwardly and has a central opening 23. Thus the ring 22 is secured in a permanent and oriented position, and it is also shown to have notches 24 and 26 on the top and bottom as shown in FIG. 2.

The headlamp 11 is secured in a vibration damping rubber ring 27 which extends around the lamp 11 and is in turn supported by a ring 28 connected to the ring 27 by extending into the ring as shown. The ring 28 has a central opening 29, and the rear portion of the headlamp 11, and the male prongs 31 of the headlamp 11 both extend through the ring opening 29 as shown.

At this point it will therefore be seen that movement of the headlamp 11 along its longitudinal axis 12 will permit electrical connection between the lamp 11 and the receptacle 19. Thus the prongs 31 may be inserted into the usual openings in the receptacle 19 when the lamp 11 is moved to plug the prongs 31 into the receptacle 19. Conversely, withdrawal of the headlamp 11 away from the receptacle 19 will disconnect the prongs 31 from their plug-in relationship in the receptacle 19. Of course the headlamp 11 can move in and out along the axis 12 as mentioned. The receptacle 19 thus has openings 32 which receive the extended prongs 31 on the lamp 11. It will be understood that it is desirable to orient the prongs 31 with respect to the openings 32 when the plug-in or electrical connection of the headlamp 11 to the receptacle 19 is desired.

To accomplish this plug-in function, the headlamp 11 is oriented with respect to the receptacle 19 when it is assemblied with the vehicle and its body portion 10. To do this, springs 33 and 34 are shown connected to the ring 28 by rivets 36. The springs 33 and 34 extend through the openings 29 and 14 and the springs extend into the slots or notches 24 and 26, respectively. The springs are shown to have indents defined by angled portions 37 on the extending ends of the springs 33 and 34, and the portions 37, along with the spring body portions 38, provide a grip on the ring 22. Also, the spring free ends 39 are angled radially inwardly to provide a lead for insertion of the headlamp 11. Springs 33 and 34 clip firmly onto the ring 22, and the inturned ends 39 provide a lead-in or snap-on type of connection. The springs are of a stiffness to firmly secure the headlamp 11 to the supporting member 22, and the projection and notch means formed by the springs and the notches 24 and 26 prevent the headlamp 11 from rotating about its axis 12. Thus the headlamp 11 will remain in the desired upright position with the upper portion 41 remaining on the top as desired so that the beam of light from the headlamp 11 will be properly emitted.

Self-locking screws 42 are connected to the support members 13 and 22, and the heads of the screws 42 abut the lamp supporting ring 28 as shown. There are three screws 42 spaced around the ring portion 13 behind the ring 28. Thus the screws 42 are available for adjusting the direction of the lamp 11 with respect to the orientation of its longitudinal axis 12 and thus the control of its emitted light. That is, if the upper one of the screws 42 were backed off from the shown position, it would cause the axis 12 to be tilted downwardly and thus cast its light downwardly from the headlamp 11. This adjustment is of course within the tolerances of the parts described and the electrical receptacle and plug-in connections will of course provide for the adjustment necessary to adjust the beam of light by means of the screws 42.

Figure 3:
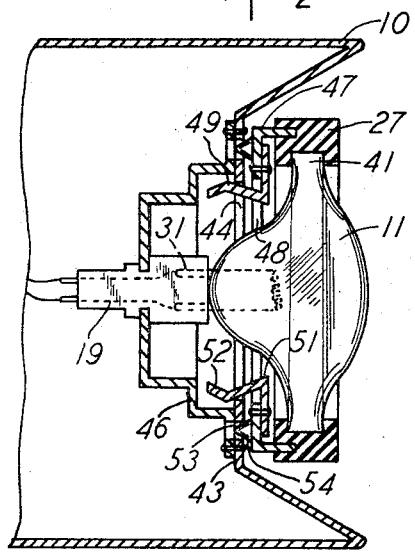
FIG. 3 is a longitudinal sectional view similar to FIG. 1 but showing another embodiment of the invention.

FIG. 3 shows another embodiment of the plug-in type of mounting for the headlamp 11, and here it will be seen that the vehicle body portion 10 has a ring 43 which has a central opening 44 for receiving the rear end of the lamp 11 and its male prongs 31. The receptacle 19 hangs permanently supported by a ring 46 riveted to the ring 43 of the body portion.

The vibration dampening ring 27 has a supporting ring 47 which has a central opening 48 through which the attachment springs 49 and 51 extend as shown. The springs 49 and 51 are shown to be riveted to the ring 48 and clipped or snapped onto the ring 43. The spring ends 52 are directed inwardly to provide for the plug-in or snap-on type of connection shown and described. Orientation means consisting of openings 53 and projections 54 are respectively provided on the rings 43 and 47. There may be two projection and notch connections 53 and 54 so that rotational orientation of the lamp 11 is established by them. Here also then, the lamp top 41 is at the top and the electrical contacts are aligned, all in a plug-in mounting.

While specific embodiments of this invention have been shown and described, it should be obvious that certain changes could be made in the embodiments and the invention should therefore be determined only by the scope of the appended claims.

What is claimed is:

1. A mechanical and electrical plug-in type headlamp mounting comprising a support member having lamp-retaining means and having rotational orientation openings spaced around said support member, an electrical receptacle, a headlamp including a plug-in type of connector mating with said receptacle for electrical connection therebetween and with the direction of movement for plugging in being along the axis of the beam of light emitted by said headlamp, and combined snap-in spring and rotational restraining means connected with said headlamp, said spring portion of said means being releasably connected with said lamp-retaining means upon plug-in movement of said headlamp, said rotational restraining portion of said means being snugly disposed in said orientation openings to align said plug-in connector with said receptacle for plug-in connecting.

2. A mechanical and electrical plug-in type headlamp mounting comprising a support member having an opening therein, an electrical receptacle fixedly mounted on said support member, a headlamp including a plug-in type of connector mating with said receptacle for electrical connection therebetween and with the direction of plug-in being along the axis of the beam of light emitted by said headlamp, said receptable and said connector having prongs and openings mated together, a spring carried by said headlamp and including an angled portion extending into said support member opening and being spring urged into said support member for releasably securing said headlamp to said support member when said headlamp is moved until it plugs into said receptacle, and projection and notch means operatively connected between said support member and said headlamp and being spaced around said headlamp in relation to the mated said prongs and openings to pilot the plug-in connection of said headlamp and being connectable upon plug-in movement of said headlamp for rotationally orienting and rotationally retaining the latter with respect to said axis.

3. A mechanical and electrical plug-in type headlamp mounting comprising a support member having a plurality of spaced-apart notches, an electrical receptacle fixedly mounted on said support member and having plug-in openings therein, a headlamp including plug-in prongs mating with said receptacle for electrical connection therebetween and with the direction of plug-in being along the axis of the beam of light emitted by said headlamp, springs carried by said headlamp and located in registry with said notches and adapted to snap onto said support member and into said notches upon plug-in movement of said headlamp for releasably securing said headlamp to said support member and being snugly received in said notches in the rotational directions of movement of said headlamp about said axis for rotationally orienting and rotationally retaining said headlamp with respect to said axis, said springs and said notches being oriented with relation to the orientation of said receptacle openings and said prongs to pilot said prongs into said receptacle openings upon plug-in movement.

4. A headlamp mounting for a vehicle having a body, comprising a headlamp having a top, a vibration damping means connected to said headlamp, spring clips connected to said vibration damping means and extending therefrom in angle portions resilient in the direction of the plane of the angle of each of said portions, support means attached to said vehicle body and disposed to mate with said angle portions for spring-snapping said headlamp onto and off from said support means, plug-in type of orientation mating means of male and female members operatively connected between said support means and said headlamp and being spaced around said support means and said headlamp in mated pairs in snug contact to dispose said top of said headlamp in the upright position and to retain said top upright, and adjustment means on said support means and being adjustably extendable therefrom and in operative abutment with said vibration damping means for adjusting said headlamp.

5. A mechanical and electrical plug-in type of headlamp mounting comprising a support member, a headlamp having a longitudinal axis along which its light is emitted, a support ring attached to said headlamp and being disposed rearwardly thereof, adjustment means connected to said support member and being movable in the direction parallel to said axis and being abuttable with said support ring at points spaced therearound for permitting adjustable positioning of said axis, and mating pairs of a leaf spring and a notch operatively connected between said support member and said support ring and being spaced around said support ring and having said leaf spring snugly received in said notch for plug-in type of mounting of said headlamp on said support member and for releasably securing said support ring against said adjustment means.

References Cited
UNITED STATES PATENTS

| | | | |
|---|---|---|---|
| 2,910,575 | 11/1959 | Meschwitzer et al. | 240—41 |
| 3,018,365 | 1/1962 | Wenman et al. | 240—41 |
| 3,025,390 | 3/1962 | Woodcock | 240—41.5 |

NORTON ANSHER, *Primary Examiner.*

W. M. FRYE, *Assistant Examiner.*